US007077230B2

(12) United States Patent
Arnold

(10) Patent No.: US 7,077,230 B2
(45) Date of Patent: Jul. 18, 2006

(54) MOTORCYCLE WITH A REAR-MOUNTED RADIATOR AND AN AIR MANAGEMENT SYSTEM FOR PROVIDING COOLING AIR THERETO

(75) Inventor: David W. Arnold, Glendale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 220 days.

(21) Appl. No.: 10/780,336

(22) Filed: Feb. 17, 2004

(65) Prior Publication Data

US 2005/0178598 A1    Aug. 18, 2005

(51) Int. Cl.
*B62K 11/02* (2006.01)
(52) U.S. Cl. .................................. 180/229; 180/68.4
(58) Field of Classification Search ................ 180/219, 180/225, 229, 68.4, 68.6, 68.3, 68.1; 165/41; 123/41.7
See application file for complete search history.

(56) References Cited

U.S. PATENT DOCUMENTS

| 4,010,812 | A |   | 3/1977  | Bothwell |
|-----------|---|---|---------|----------|
| 4,366,880 | A |   | 1/1983  | Miller et al. |
| 4,445,587 | A |   | 5/1984  | Hillman |
| 4,632,206 | A | * | 12/1986 | Morinaka et al. ........... 180/229 |
| 4,633,965 | A | * | 1/1987  | Tsurumi et al. ............. 180/229 |
| 4,660,624 | A |   | 4/1987  | Yamaguchi |
| 4,830,135 | A | * | 5/1989  | Yamashita ................... 180/229 |
| 4,876,778 | A |   | 10/1989 | Hagihara et al. |
| 5,012,883 | A | * | 5/1991  | Hiramatsu ................... 180/225 |
| 6,105,701 | A | * | 8/2000  | Buell ........................... 180/229 |
| 6,332,505 | B1 |   | 12/2001 | Tateshima et al. |
| D461,157  | S |   | 8/2002  | Myers et al. |
| 6,502,658 | B1 |   | 1/2003  | Nagashii |
| 6,543,523 | B1 |   | 4/2003  | Hasumi |
| 6,695,088 | B1 | * | 2/2004  | Schroeder ................... 180/229 |
| 2003/0000755 | A1 |   | 1/2003  | Schroeder |

FOREIGN PATENT DOCUMENTS

| JP | 61-1221180 | 8/1986 |
| JP | 62-11273   | 3/1987 |
| JP | 5-201375   | 8/1993 |
| JP | 5-330470   | 12/1993 |
| JP | 6-171568   | 6/1994 |
| JP | 2725185    | 12/1997 |
| JP | 2576872    | 5/1998 |
| JP | 2003-48588 | 2/2003 |

OTHER PUBLICATIONS www.benelli.com web page (1 sheet), May 16, 2001.
www.2wf.com web pages (2 sheets), May 14, 2001.
www.tornadobenelli.com web pages (12 sheets), May 16, 2001.

* cited by examiner

*Primary Examiner*—Anne Marie Boehler
(74) *Attorney, Agent, or Firm*—Rankin, Hill, Porter & Clark LLP; Christen Millard

(57) ABSTRACT

A motorcycle having a radiator positioned between an engine and a rear wheel and including an air management system for guiding cooling air to the radiator. The air management system includes a pair of top ducts, a middle duct, a bottom duct and a pair of rear ducts. The top and middle ducts extend over the engine, while the bottom duct extends below the engine. The rear ducts are disposed rearward of the engine.

35 Claims, 4 Drawing Sheets

MOTORCYCLE WITH A REAR-MOUNTED RADIATOR AND AN AIR MANAGEMENT SYSTEM FOR PROVIDING COOLING AIR THERETO

BACKGROUND OF THE INVENTION

The present invention is directed toward a system for managing air in a motorcycle and, more particularly, toward a system for providing air to a radiator mounted toward the rear of a motorcycle.

Conventionally, a motorcycle has a radiator mounted in front of the engine and behind the front forks. The radiator is mounted in this forward location to enable the radiator to receive cooling air during operation of the motorcycle. This forward location, however, is not without disadvantages. At least a portion of the cooling air is blocked by front portions of the motorcycle, such as the front wheel, front forks, front fender and fairing. Accordingly, the size of the radiator must be increased to obtain satisfactory cooling performance. This, in turn, increases the front profile of the motorcycle, which is aesthetically undesirable and adversely affects the aerodynamics of the motorcycle.

In order to address these disadvantages, it has been proposed to provide a motorcycle with a radiator that is mounted toward the rear of the motorcycle. Examples of such motorcycles are shown in Japanese Patent Publication No. JP6171568, Japanese Patent Publication No. 5201375, U.S. Pat. No. 4,445,587 to Hillman and U.S. Pat. No. 4,010,812 to Bothwell. In the motorcycle disclosed in Japanese Patent Publication No. 5201375, a radiator is mounted between support tubes for right and left seat rails of a frame. Air is guided to the radiator by a single air guide duct that extends longitudinally between an engine and a fuel tank of the motorcycle.

Although a rear-mounted radiator improves the aesthetics and aerodynamics of a motorcycle, the placement of the radiator away from the front of the motorcycle presents other concerns. Since the radiator is positioned away from the air flow impinging on the motorcycle, an air management system must be provided to supply a sufficient amount of cooling air to the radiator.

Therefore, there exists a need in the art for a cooling system that places the radiator in a more advantageous rearward position, and for an air management system that delivers air to the radiator.

SUMMARY OF THE INVENTION

In accordance with the present invention, a motorcycle is provided having a rear-mounted radiator and an air management system for guiding cooling air to the radiator. The motorcycle includes a frame supported on and connected to front and rear wheels. An engine is mounted to the frame and is disposed between the front and rear wheels. A seat and the radiator are also mounted to the frame. The radiator is positioned between the engine and the rear wheel. The motorcycle may have a pair of top air ducts, a bottom air duct, a middle air duct and/or a pair of rear air ducts for guiding cooling air to the radiator. The top air ducts extend over the engine and have inlets disposed on opposing sides of the steering head. The bottom air duct extends under the engine and has an inlet located forwardly of at least a majority of the engine. The middle air duct extends over the engine and has an inlet located below the steering head and laterally aligned with a space between the down pipes. The rear air ducts have inlets located rearwardly of the engine and below the seat. Outlets of the top air ducts, the bottom air duct, the middle air duct and the rear air ducts are all positioned to permit exiting air to communicate with the radiator. The top air ducts and the middle air duct may be secured together to form a duct structure, which is secured to seat rails to form a top frame structure.

BRIEF DESCRIPTION OF THE DRAWINGS

The features, aspects, and advantages of the present invention will become better understood with regard to the following description, appended claims, and accompanying drawings where:

DETAILED DESCRIPTION OF THE PREFERRED EMBODIMENTS

Figure 1:
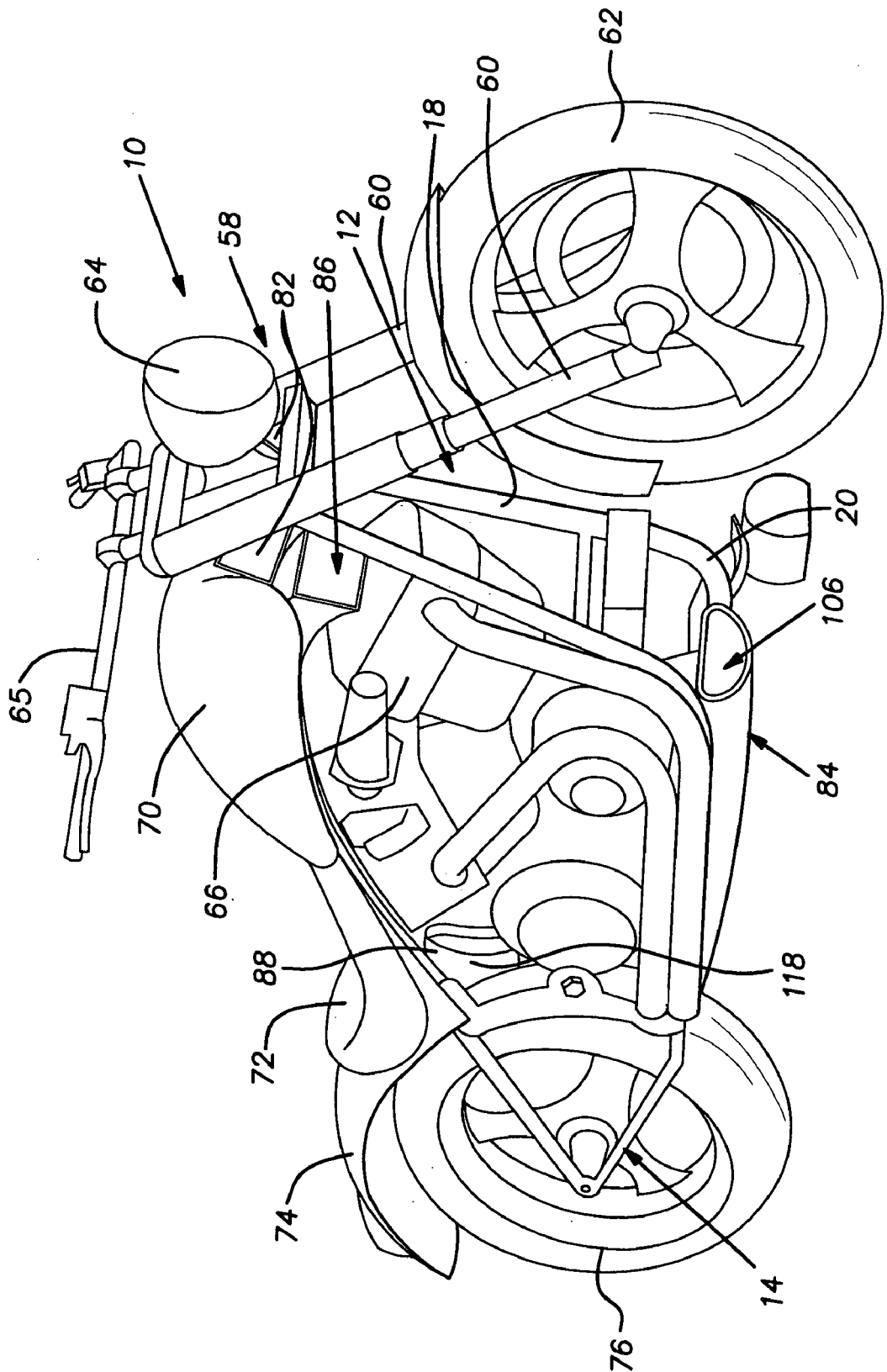
FIG. 1 is a front perspective view of a motorcycle having a cooling system and an air management system embodied in accordance with the present invention.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Figure 2:
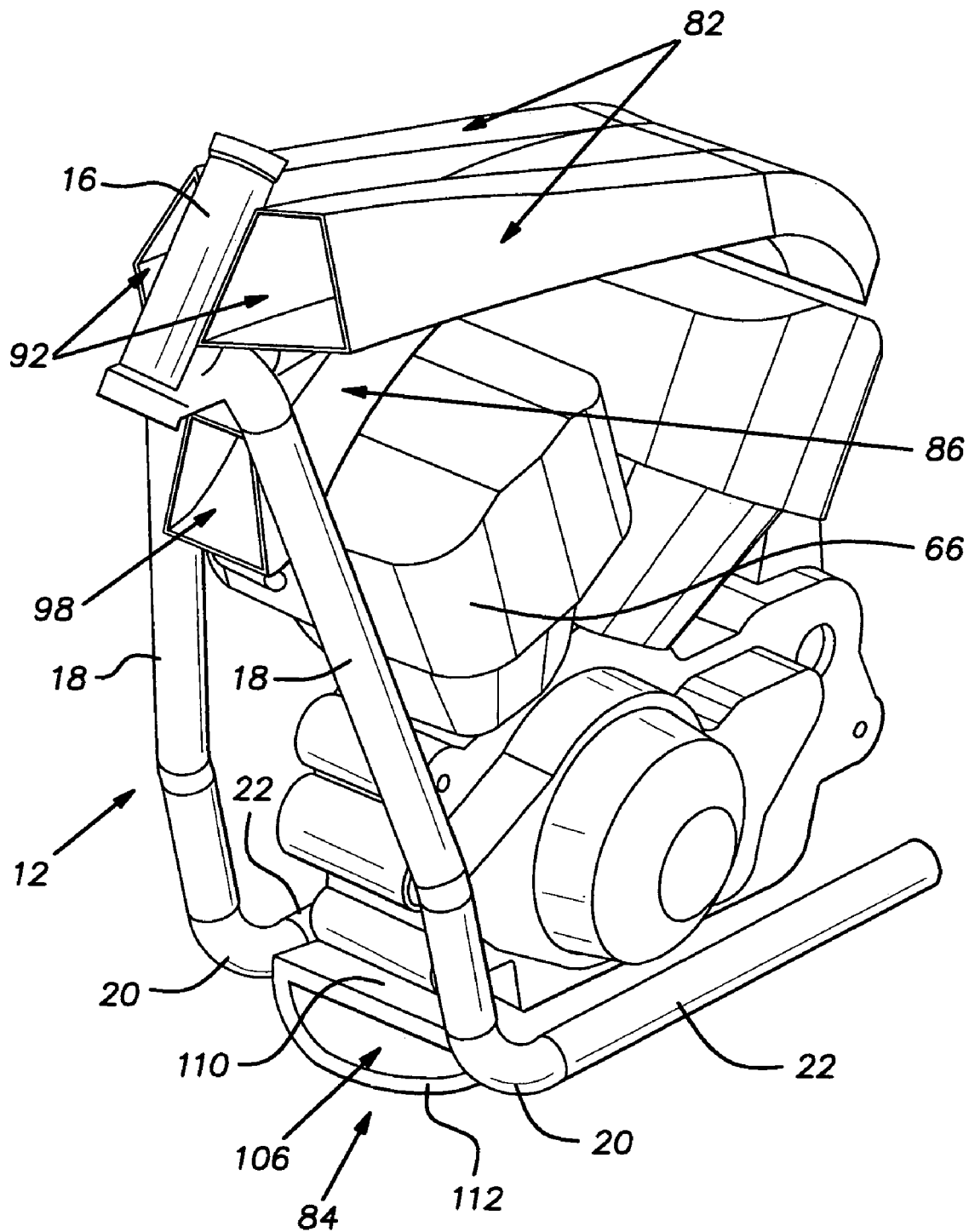
FIG. 2 is a front perspective view of a portion of a motorcycle substantially similar to the motorcycle shown in FIG. 1, showing a pair of top ducts and a middle duct of an air management system substantially similar to the air management system of the motorcycle shown in FIG. 1.
Figure 3:
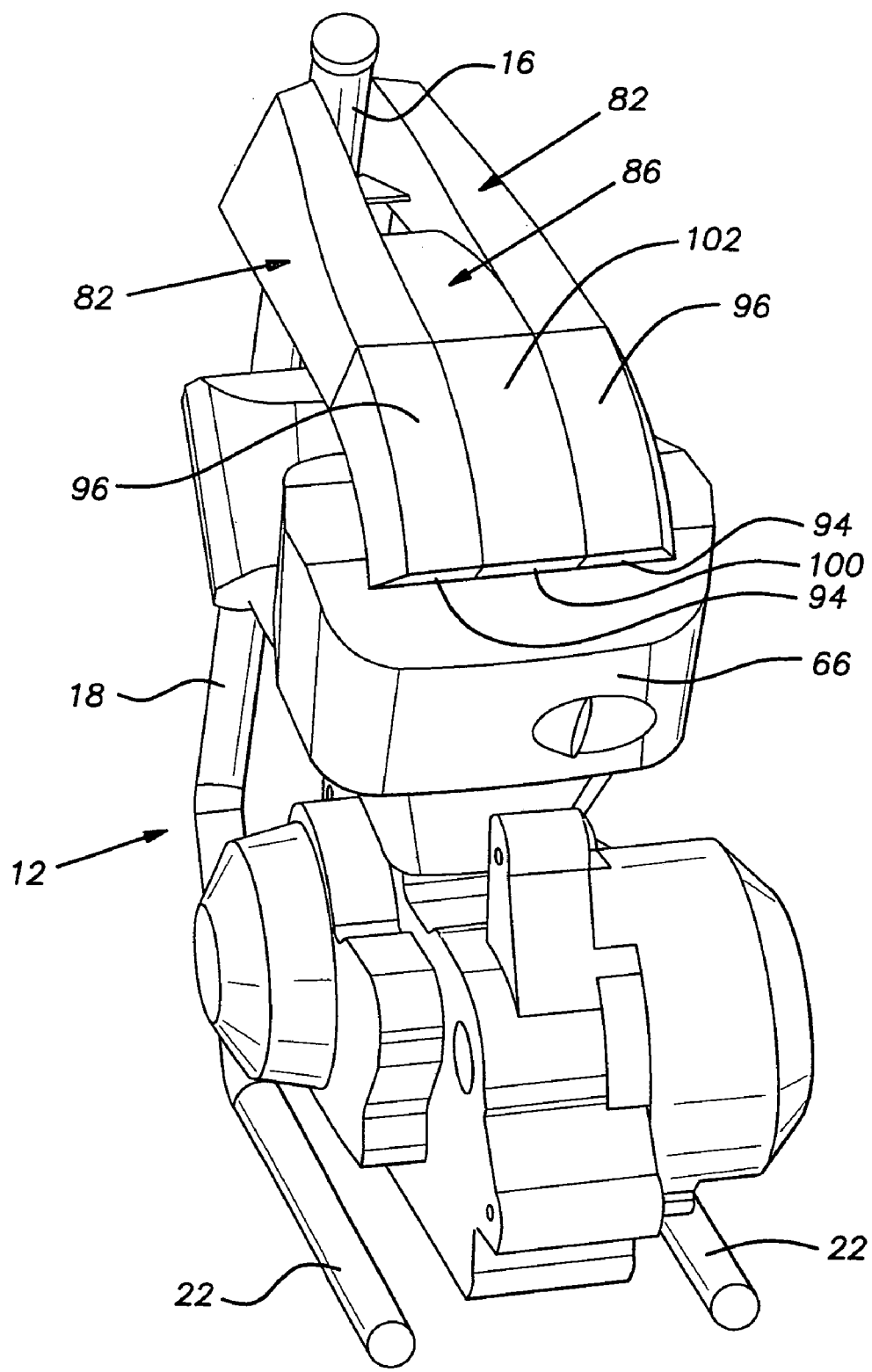
FIG. 3 is a rear perspective view of a portion of the motorcycle shown in FIG. 1, showing the top ducts and the middle duct of the air management system.
Figure 4:
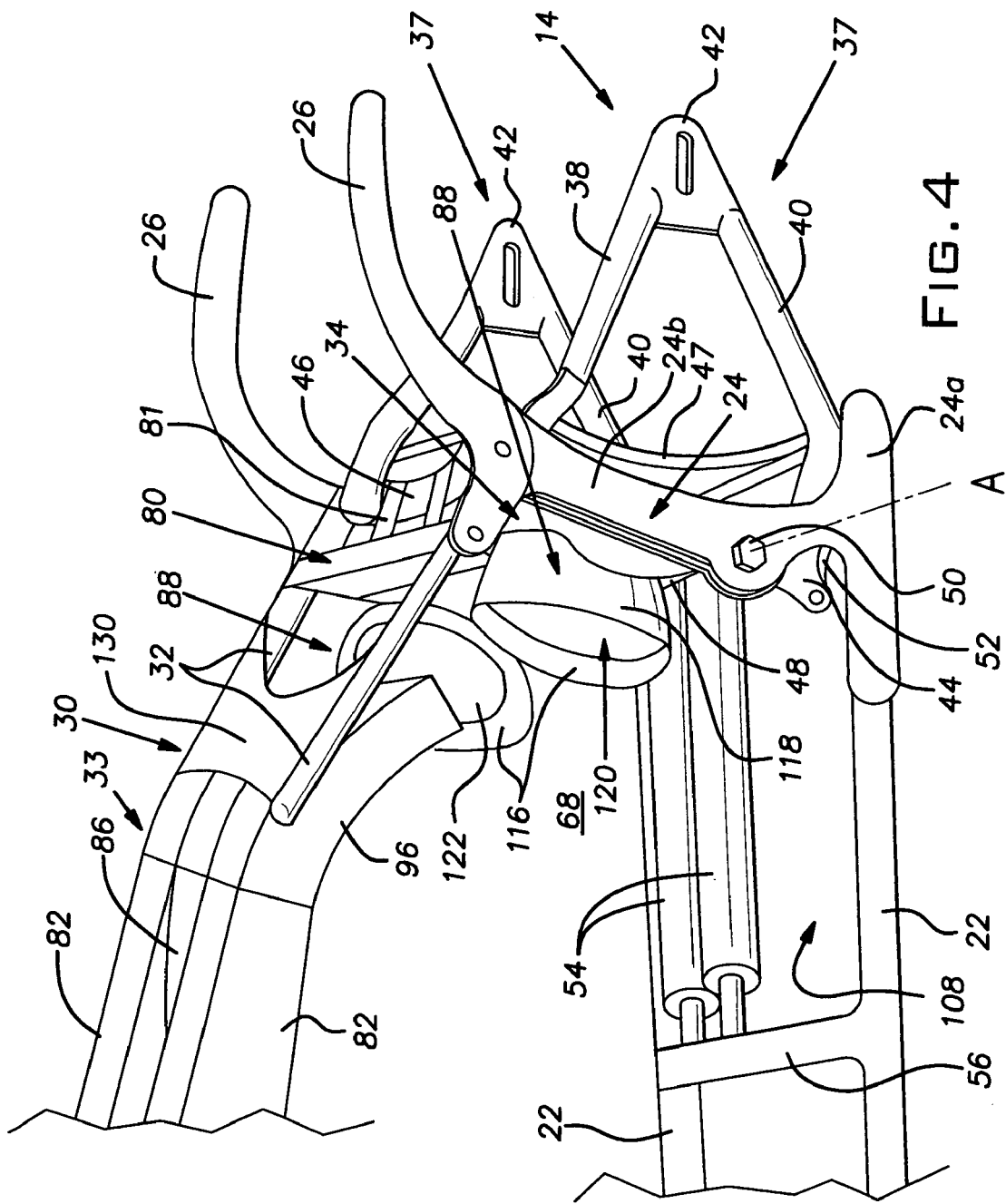
FIG. 4 is a side perspective view of a portion of the motorcycle shown in FIG. 1, showing a radiator of the cooling system and rear ducts of the air management system.

The present invention is directed to a motorcycle having a cooling system comprising a rear-mounted radiator and an air management system comprising a plurality of air ducts for guiding cooling air to the radiator. In order to better show the invention, only portions of the motorcycle are shown in FIGS. 2, 3 and 4 and components of the motorcycle have been removed from the portions shown. For example, in FIG. 4, an engine of the motorcycle has been removed to better show features of the present invention.

Referring now to FIG. 1, there is shown a motorcycle 10 which incorporates the cooling and air management systems of the present invention. The motorcycle 10 has a frame that includes a front frame 12 and a rear swing arm or frame 14. Although the motorcycle 10 is shown having a rear swing frame 14, it should be appreciated that the present invention is not limited to use in motorcycles having rear swing frames.

Referring now also to FIGS. 2, 3 and 4, the front frame 12 includes a steering head 16 with a pair of spaced-apart down tubes or pipes 18 extending downwardly and rearwardly therefrom. Lower portions of the down pipes 18 are joined at bends 20 to a pair of bottom tubes or pipes 22 that extend rearwardly and are generally horizontally disposed. Rear portions of the bottom pipes 22 are fixed to a pair of rear stays 24, each of which includes a horizontal base portion 24*a* joined to a vertical post portion 24*b* having a rearward arc. Lower bent portions of a pair of fender supports 26 are secured to the post portions 24*b*. From the lower bent portions, the fender supports 26 curve upwardly and rearwardly to form continuations of the rearward arcs of the post portions 24b of the rear stays 24. A top frame structure 30 extends between the steering head 16 and the rear stays 24. As will be described more fully below, the top frame structure 30 may be comprised of a pair of seat rails 32 and a duct structure 33. The seat rails 32 are secured to the rear stays 24 and form a pair of corner regions 34 therewith.

With particular reference now to FIG. 4, the rear swing frame 14 has a generally triangular shape and includes a pair of generally triangular side structures 37, each of which includes a pair of upper and lower arms 38, 40 connected to a generally C-shaped forward mount 44. In each side structure 37, rearward ends of the upper and lower arms 38, 40 are joined together at a wheel mount 42 and forward portions of the upper and lower arms 38, 40 are joined to the forward mount 44. The upper and lower arms 38, 40 of each side structure 37 extend forwardly at acute angles to each other from the rear wheel mount 42 to the forward mount 44. The lower arms 40 are spaced apart and joined together by an arcuate transverse lower cross member (not shown), while the upper arms 38 are spaced apart and joined together by an arcuate transverse upper cross member 46. An arcuate shield plate or inner fender 47 is preferably secured to the rear swing frame 14. The inner fender 47 extends between the upper cross member 46 and the lower cross member and between the side structures 37. The inner fender 47 may be secured to the upper cross member 46 and the lower cross member, as well as to the upper arms 38 and the lower arms 40. The inner fender 47 may have a rigid or semi-rigid construction and may be composed of plastic or metal, such as aluminum or steel.

The rear swing frame 14 is pivotally connected to the front frame 12 by a pivot axle 48 that extends between the forward mounts 44 and the rear stays 24 of the front frame 12. On each side of the frame, a pivot pin 50 extends through aligned openings in the forward mount 44 and the rear stay 24 and is received in the pivot axle 48. The forward mounts 44 are connected by links 52 to a track member (not shown) connected to posterior ends of a pair of shock absorbers 54, which are disposed between the bottom pipes 22 of the front frame 12. Anterior ends of the shock absorbers are connected to a cross member 56 secured between the bottom pipes 22.

With particular reference to FIG. 1, a front fork assembly 58 is rotatably connected to the steering head 16. The front fork assembly 58 comprises a pair of elongated fork legs 60 that extend downwardly and forwardly from the steering head 16. A front wheel 62 is rotatably connected between the lower ends of the fork legs 60. A headlight 64 is secured to the front fork assembly 58 and is disposed between the upper ends of the fork legs 60. Handle bars 65 are connected to the front fork assembly 58 for moving the same.

A multi-cylinder, water-cooled engine 66 is secured to and supported by the front frame 12. The engine 66 is vertically disposed between the bottom pipes 22 and the top frame structure 30 and is longitudinally disposed between the down pipes 18 and the rear stays 24. A rear portion of the engine 66 is spaced forwardly from the rear stays 24 and the inner fender 47. In this manner, a rear cooling space 68 (shown in FIG. 4) is formed between the rear portion of the engine 66 and the inner fender 47. A fuel tank 70 is provided for supplying fuel to the engine 66. The fuel tank 70 is disposed over and is secured to the top frame structure 30, above the engine 66. A seat 72 is mounted to the seat rails 32 of the front frame 12 and is disposed rearwardly of the fuel tank 70. The seat 72 may extend over a rear fender 74 that is secured to the fender supports 26. A rear wheel 76 is rotatably connected between the rear wheel mounts 42 of the rear swing frame 14. The rear wheel 76 is driven by the engine 66 through a suitable drive system known in the art. For example, the engine 66 may drive the rear wheel 76 through a drive chain, a rotatable drive shaft, or an endless toothed drive belt.

With particular reference now to FIG. 4, the radiator (designated with the reference numeral 80) is disposed in the cooling space 68 between the engine 66 and the inner fender 47. The radiator 80 has a rectangular shape and is preferably secured to the rear swing frame 14, as is shown. The radiator 80, however, may instead be secured to the front frame 12. For example, the radiator 80 may be connected to the seat rails 32 and the bottom pipes 22. Regardless of whether the radiator 80 is secured to the rear swing frame 14 or the front frame 12, the radiator 80 is disposed in the cooling space 68 between the engine 66 and the inner fender 47 and is positioned so as to be below the seat 72. In addition, an uppermost portion of the radiator 80 is preferably disposed at a lower level than an uppermost portion of the rear wheel 76.

The radiator 80 is preferably mounted to the rear swing frame 14 by a removable top mounting bracket 81 and a bottom mounting bracket (not shown). The top mounting bracket 81 secures a top portion of the radiator 80 to the upper cross member 46 of the rear swing frame 14, while the bottom mounting bracket secures a bottom portion of the radiator 80 to the lower cross member of the rear swing frame 14. With this mounting, the radiator 80 is laterally disposed between the forward mounts 44 of the rear swing frame 14 and is longitudinally disposed between the engine 66 and the rear wheel 76. More specifically, the radiator 80 is longitudinally disposed between the pivot axle 48 and the inner fender 47. The radiator 80 is connected to the engine 66 by a pair of water lines (not shown), through which cooling water from the radiator 80 is supplied to the engine 66 and heated water is returned to the radiator 80 from the engine 66, respectively. Although not shown, fans are preferably mounted behind the radiator 80 and are operable to draw air from the radiator 80 and to direct the air rearwardly, toward the rear wheel 76.

It should be appreciated that an alternate mounting design may be used to mount the radiator 80 to the rear swing frame 14, or to mount the radiator 80 to the front frame 12, as contemplated above. If such an alternate mounting design is utilized, then the radiator 80 may have a different position relative to the pivot axle 48 (and pivot axis). For example, the radiator 80 may be mounted so as to be located forward of the pivot axle 48 (and pivot axis), i.e., between the engine 66 and the pivot axle 48 (and pivot axis). The radiator 80 may also be especially constructed and positioned such that the pivot axle 48 (and pivot axis) extends through the radiator 80.

With the radiator 80 positioned as described above, the radiator 80 and any fans mounted behind the same are shielded from the rear wheel 76 by the inner fender 47, which is disposed between the radiator 80 and the rear wheel 76. The inner fender 47 blocks debris thrown up by the rear wheel 76 so as to prevent such debris from impinging against the radiator 80 and/or any fans and thereby damaging the same. In addition, the inner fender 47 blocks air turbulence generated by the rear wheel 76 so as to prevent such air turbulence from interfering with the flow of warm air exiting from the rear of the radiator 80 and any fans. In addition to shielding the radiator 80 and any fans from the rear wheel 76, the inner fender 47 also shields the rear wheel 76 from the warm air exiting the radiator 80 and any fans, i.e., the inner fender 47 blocks the warm air exiting the radiator 80 and any fans so as to prevent the warm air from heating up the tire of the rear wheel 76. More specifically, the inner fender 47 cooperates with an inner surface of the rear fender 74 to define an air egress channel that guides the warm air upward rearward, between the inner fender 47 and the rear fender 74. With the warm air being conducted upward and rearward through the egress channel, both the rear wheel 76 and the seat 72 (and, thus, the operator) are substantially insulated and, thus, protected from the warm air.

It should be appreciated that the inner fender 47 may be mounted to the front frame 12, instead of the rear swing frame 14, as described above. Such an alternate mounting of the inner fender 47 may be utilized in connection with an alternate mounting design of the radiator 80, as contemplated above. Preferably, any such alternate mounting of the inner fender 47 and/or the radiator 80 is accomplished so as to retain the benefits of the mounting of the inner fender 47 and the radiator 80 described above, namely providing protection for the radiator 80 and the rear wheel 76 and guiding warm air from the radiator 80 upward and rearward.

With the construction described above, the motorcycle 10 has a longitudinal plane about which the motorcycle 10 is generally laterally symmetrical. The longitudinal plane extends through the steering head 16 and the front and rear wheels 62, 76.

The radiator 80 is supplied with cooling air by an air management system embodied in accordance with the present invention. The air management system comprises a plurality of air ducts that guide cooling air from the front of the motorcycle 10 to the rear cooling space 68 between the engine 66 and the inner fender 47. More specifically, the air management system comprises top ducts 82, a bottom duct 84, a middle duct 86 and a pair of rear ducts 88.

Referring now to FIGS. 1–3, the top ducts 82 define air passages extending rearward from the steering head 16 to the cooling space 68, or proximate to the cooling space 68. The top ducts 82 are disposed on opposing sides of the longitudinal plane of the motorcycle 10 and are positioned above the engine 66. The top ducts 82 each include an inlet 92 and an outlet 94 and are preferably enclosed, except for the inlets 92 and the outlets 94. The top ducts 82 may be channel-shaped, as shown, or tube shaped. If the top ducts 82 are channel-shaped, they may have a trapezoidal cross-section, as shown. The top ducts 82 may have a rigid or semi-rigid construction and may be composed of metal or plastic. When the top ducts 82 help form the top frame structure 30, the top ducts 82 have a rigid construction and are composed of a metal, such as steel, and the inside walls of the top ducts 82 (toward the inlets 92) are joined by welding and/or other securement means to opposing sides of the steering head 16, respectively.

The inlets 92 of the top ducts 82 are disposed on opposing sides of the steering head 16 and the longitudinal plane of the motorcycle 10. The inlets 92 are longitudinally positioned so as to be disposed at, or slightly rearward of, the center axis of the steering head 16. The inlets 92, however, may be disposed more forwardly. For example, the inlets 92 may be longitudinally positioned so as to be disposed at, or slightly rearward, of a lens of the headlight 64. The inlets 92 face forward and preferably have a slight rearward and outward slant. The outlets 94 of the top ducts 82 are also disposed on opposing sides of the longitudinal plane of the motorcycle 10. Rear portions 96 of the top ducts 82 curve downwardly such that the outlets 94 face rearward and downward. The outlets 94 are longitudinally positioned so as to be disposed in the cooling space 68, or so as to be in substantially unimpeded air flow communication with the cooling space 68 and the radiator 80. In this manner, the outlets 94 are positioned so as to permit air exiting the top ducts 82 to travel substantially unimpeded to the radiator 80.

The middle duct 86 defines an air passage that extends arcuately rearward from the steering head 16 to the cooling space 68, or proximate to the cooling space 68. The middle duct 86 is longitudinally divided by the longitudinal plane of the motorcycle 10, i.e., the longitudinal plane of the motorcycle 10 extends through the middle duct 86. The middle duct 86 is disposed over the engine 66 and may be secured between the top ducts 82. The middle duct 86 includes an inlet 98 and an outlet 100 and is preferably enclosed, except for the inlet 98 and the outlet 100. The middle duct 86 may be channel-shaped, as shown, or tube shaped. If the middle duct 86 is channel-shaped, it may have a trapezoidal cross-section, as shown. The middle duct 86 may have a rigid or semi-rigid construction and may be composed of metal or plastic. When the middle duct 86 helps form the top frame structure 30, the middle duct 86 has a rigid construction and is composed of a metal, such as steel.

The inlet 98 of the middle duct 86 is disposed below the steering head 16 and, thus, is disposed below the inlets 92 of the top ducts 82. The inlet 98 of the middle duct 86 faces forward and is divided by the longitudinal plane of the motorcycle 10. The inlet 98 is laterally aligned with a space between the down pipes 18. As shown in FIG. 1, the inlet 98 may be longitudinally positioned so as to be disposed rearward from the down pipes 18. The inlet 98, however, may be disposed more forwardly. For example, the inlet 98 may be disposed between the down pipes 18 and substantially in alignment with the inlets 92 of the top ducts 82, as shown in FIG. 2. The outlet 100 of the middle duct 86 is divided by the longitudinal plane of the motorcycle 10. A rear portion 102 of the middle duct 86 curves downwardly such that the outlet 100 faces rearward and downward. The outlet 100 of the middle duct 86 is disposed between the outlets 94 of the top ducts 82 and is preferably laterally and longitudinally aligned with the outlets 94 of the top ducts 82. In this manner, the outlet 100 and the outlets 94 form a laterally extending line of rearwardly and downwardly extending outlets. As with the outlets 94 of the top ducts 82, the outlet 100 of the middle duct 86 is positioned so as to permit air exiting the middle duct 86 to travel substantially unimpeded to the radiator 80.

The bottom duct 84 defines an air passage extending from the bends 20 to the cooling space 68, or proximate to the cooling space 68. The bottom duct 84 is longitudinally divided by the longitudinal plane of the motorcycle 10, i.e., the longitudinal plane of the motorcycle 10 extends through the bottom duct 84. The bottom duct 84 is disposed below the engine 66 and between the bottom pipes 22, and may be secured to the bottom pipes 22. The bottom duct 84 includes an inlet 106 and an outlet 108 and is preferably enclosed, except for the inlet 106 and the outlet 108. The bottom duct 84 is preferably scoop-shaped, having a flat top wall 110 and an arcuate bottom wall 112. The bottom duct 84 may have a rigid or semi-rigid construction and may be composed of plastic or a metal, such as aluminum or steel.

The inlet 106 of the bottom duct 84 is disposed below the engine 66 and is longitudinally positioned so as to be forward of at least a majority of the engine 66 and disposed at, or slightly rearward or forward of, the bends 20. The inlet 106 of the bottom duct 84 faces forward and is divided by the longitudinal plane of the motorcycle 10. The outlet 108 of the bottom duct 84 faces upwardly. A substantial portion of the top wall 110 of the bottom duct 84 may be removed under the engine 66 and the cooling space 68. In this regard, a bottom portion of the engine 66 may form part of the top of the bottom duct 84. The outlet 108 is longitudinally positioned so as to be disposed in the cooling space 68, or so as to be in substantially unimpeded air flow communication with the cooling space 68 and the radiator 80. In this manner, the outlet 108 is positioned so as to permit air exiting the bottom duct 84 to travel substantially unimpeded to the radiator 80.

The rear ducts 88 define laterally inward and rearwardly extending air passages. The rear ducts 88 are disposed on opposing sides of the longitudinal plane of the motorcycle 10, below the seat 72 and rearwardly and outwardly of the engine 66. More preferably, the rear ducts 88 are disposed in the corner regions 34 between the rear stays 24 and the seat rails 32. The rear ducts 88 may be secured to the rear stays 24, respectively or to an air box surrounding the radiator 80. Each of the rear ducts 88 is preferably scoop-shaped, having a flat inner wall 116 and an arcuate outer wall 118. The rear ducts 88 may have rigid or semi-rigid constructions and may be composed of plastic or a metal, such as aluminum or steel.

Inlets 120 of the rear ducts 88 are formed between the inner and outer walls 116, 118 and face forward. The inlets 120 are disposed on opposing sides of the radiator 80 and the longitudinal plane of the motorcycle 10. Outlets 122 of the rear ducts 88 are formed in the inner walls 116 and face inwardly. The outlets 122 are positioned so as to be disposed in the cooling space 68, or so as to be in substantially unimpeded air flow communication with the cooling space 68 and the radiator 80. In this manner, the outlets 122 are positioned so as to permit air exiting the rear ducts 88 to travel substantially unimpeded to the radiator 80.

Referring now to FIG. 4, the top ducts 82 and the middle duct 86 are secured together to form the duct structure 33. Preferably, the top ducts 82 and the middle duct 86 are secured together so that inner and outer side walls of the middle duct 86 (at least in the rear portion 102 thereof respectively adjoin inner side walls of the top ducts 82 (at least in the rear portions 96 thereof. The top ducts 82 and the middle duct 86 may be joined together by welding or other securement means. The duct structure 33 is joined to forward portions of the seat rails 32 by welding or other securement means. A brace 130 may be disposed between the seat rails 32, proximate to the juncture of the seat rails 32 and the duct structure 33, and may be secured to the seat rails 32, respectively, as well as to the duct structure 33. Together, the duct structure 33 (comprising the top ducts 82 and the middle duct 86), the brace 130 and the seat rails 32 form the top frame structure 30. As set forth above, inside walls of the top ducts 82 (toward the inlets 92) are joined by welding and/or other securement means to opposing sides of the steering head 16, respectively, and rear portions of the seat rails 32 are secured to the rear stays 24. In this manner, the top frame structure 30 has a front portion secured to the steering head 16 and a rear portion secured to the rear stays 24.

With the construction described above, the top frame structure 30 forms a unique frame structure, which, in addition to being an integral portion of the front frame 12, functions as a conduit for conducting air from the front of the motorcycle 10 to the rear-mounted radiator 80.

When the motorcycle 10 is moving forward, air enters the top ducts 82, the middle duct 86, the bottom duct 84 and the rear ducts 88. Air streams in the top ducts 82 and the middle duct 86 move rearwardly over the engine 66 and then exit through the outlets 94, 100, moving rearwardly and downwardly into the cooling space 68 and against the radiator 80. Air streams in the rear ducts 88 are directed laterally inward, moving into the cooling space 68 through the outlets 122 and thence against the radiator 80. Air in the bottom duct 84 moves rearwardly under the engine 66 and then exits through the outlet 104, moving upwardly and rearwardly into the cooling space 68 and against the radiator 80. In this manner, the air management system produces air streams that impinge upon the radiator 80 from top, bottom and side directions. Heated air exits the radiator 80 and passes through the air egress channel, which guides the warm air upward and rearward, between the inner fender 47 and the rear fender 74. As set forth above, fans are preferably mounted behind the radiator 80 and are operable to draw air through the radiator 80 when the motorcycle 10 is stationary and moving.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A motorcycle comprising:
   (a.) front and rear wheels;
   (b.) a frame supported on and connected to the front and rear wheels;
   (c.) an engine mounted to the frame and disposed between the front and rear wheels;
   (d.) a seat mounted to the frame;
   (e.) a radiator mounted to the frame and positioned between the engine and the rear wheel; and
   (f.) a bottom air duct for guiding cooling air to the radiator, said bottom air duct extending under the engine and having an inlet located forwardly of at least a majority of the engine and an outlet positioned to permit exiting air to communicate with the radiator.

2. The motorcycle of claim 1, wherein the frame comprises:
   a steering head;
   a pair of spaced-apart down pipes secured to the steering head and extending downwardly and rearwardly therefrom; and
   a pair of bottom pipes joined at bends to bottom portions of the down pipes and extending rearwardly therefrom.

3. The motorcycle of claim 2, wherein the bottom air duct is disposed between the bottom pipes of the frame.

4. The motorcycle of claim 3, wherein the inlet of the bottom air duct is disposed at least proximate to the bends.

5. The motorcycle of claim 2, further comprising a pair of top air ducts for guiding cooling air to the radiator, said top air ducts extending over the engine and having inlets disposed on opposing sides of the steering head.

6. The motorcycle of claim 5, further comprising a middle air duct for guiding cooling air to the radiator, said middle air duct extending over the engine and having an inlet located below the steering head and in lateral alignment with a space between the down pipes.

7. The motorcycle of claim 2, further comprising a middle air duct for guiding cooling air to the radiator, said middle air duct extending over the engine and having an inlet located below the steering head and in lateral alignment with a space between the down pipes and an outlet positioned to permit exiting air to communicate with the radiator.

8. A motorcycle comprising:
(a.) front and rear wheels;
(b.) a frame supported on and connected to the front and rear wheels, said frame comprising:
a steering head;
a pair of down pipes secured to the steering head and extending downwardly and rearwardly therefrom, said down pipes being spaced apart to define a space therebetween; and
a pair of bottom pipes joined at bends to bottom portions of the down pipes and extending rearwardly therefrom;
(c.) an engine mounted to the frame and disposed between the front and rear wheels;
(d.) a seat mounted to the frame;
(e.) a radiator mounted to the frame and positioned between the engine and the rear wheel and disposed such that an uppermost portion of the radiator is disposed at a lower level than an uppermost portion of the rear wheel;
(f.) a middle air duct for guiding cooling air to the radiator, said middle air duct extending over the engine and having an inlet located below the steering head and in lateral alignment with the space between the down pipes and an outlet positioned to permit exiting air to communicate with the radiator; and
(g.) at least one rear air duct for guiding cooling air to the radiator, said at least one rear air duct having an inlet located rearwardly of the engine and below the seat and an outlet positioned to permit exiting air to communicate with the radiator.

9. The motorcycle of claim 8, further comprising a pair of top air ducts for guiding cooling air to the radiator, said top air ducts extending over the engine and having inlets disposed on opposing sides of the steering head and outlets positioned to permit exiting air to communicate with the radiator, said inlets of the top air ducts being disposed above the inlet of the middle air duct.

10. The motorcycle of claim 9, wherein the outlet of the middle air duct is laterally and longitudinally aligned with the outlets of the top air ducts.

11. The motorcycle of claim 10, wherein the outlet of the middle air duct is disposed between the outlets of the top air ducts.

12. The motorcycle of claim 8, wherein the inlet of the middle duct is disposed between the down pipes.

13. A motorcycle comprising:
(a.) front and rear wheels;
(b.) a frame supported on and connected to the front and rear wheels;
(c.) an engine mounted to the frame and disposed between the front and rear wheels;
(d.) a seat mounted to the frame;
(e.) a radiator mounted to the frame and positioned between the engine and the rear wheel; and
(f.) at least one rear air duct for guiding cooling air to the radiator, said at least one rear air duct having an inlet located rearwardly of the engine and below the seat and an outlet positioned to permit exiting air to communicate with the radiator.

14. The motorcycle of claim 13, wherein the frame comprises:
a steering head;
a pair of spaced-apart down pipes secured to the steering head and extending downwardly and rearwardly therefrom; and
a pair of bottom pipes joined at bends to bottom portions of the down pipes and extending rearwardly therefrom.

15. The motorcycle of claim 14, wherein the frame further comprises:
a pair of rear stays secured to rear portions of the bottom pipes and extending upwardly therefrom; and
a top frame portion secured between the steering head and the rear stays, said top frame portion including a pair of seat rails.

16. The motorcycle of claim 15, wherein the at least one rear air duct comprises a pair of rear air ducts, each having an inlet located rearwardly of the engine and below the seat and an outlet positioned to permit exiting air to communicate with the radiator.

17. The motorcycle of claim 16, wherein the inlets of the rear air ducts are respectively disposed in corner regions formed between the seat rails and the rear stays, respectively.

18. The motorcycle of claim 14, wherein the at least one rear air duct comprises a pair of rear air ducts, each having an inlet located rearwardly of the engine and below the seat and an outlet positioned to permit exiting air to communicate with the radiator.

19. The motorcycle of claim 18, further comprising a bottom air duct for guiding cooling air to the radiator, said bottom air duct extending under the engine and having an inlet located forwardly of at least a majority of the engine and an outlet positioned to permit exiting air to communicate with the radiator.

20. The motorcycle of claim 19, further comprising a middle air duct for guiding cooling air to the radiator, said middle air duct extending over the engine and having an inlet located below the steering head and in lateral alignment with a space between the down pipes.

21. The motorcycle of claim 20, further comprising a pair of top air ducts for guiding cooling air to the radiator, said top air ducts extending over the engine and having inlets disposed on opposing sides of the steering head and an outlet positioned to permit exiting air to communicate with the radiator, said inlets of the top air ducts being disposed above the inlet of the middle air duct.

22. A motorcycle comprising:
(a.) front and rear wheels;
(b.) a frame supported on and connected to the front and rear wheels, said frame comprising:
a steering head;
a pair of spaced-apart down pipes secured to the steering head and extending downwardly and rearwardly therefrom; and
a pair of bottom pipes joined at bends to bottom portions of the down pipes and extending rearwardly therefrom;
(c.) an engine mounted to the frame and disposed between the front and rear wheels;
(d.) a seat mounted to the frame;
(e.) a radiator mounted to the frame and positioned between the engine and the rear wheel; and
(f.) an air management system comprising a plurality of air ducts for guiding cooling air to the radiator, a first one of the air ducts extending over the engine and a second one of the air ducts extending under the engine.

23. The motorcycle of claim 22, wherein a third one of the ducts is disposed rearward of the engine.

24. The motorcycle of claim 23, wherein a fourth one of the ducts is disposed rearward of the engine.

25. The motorcycle of claim 24, wherein a fifth one of the ducts and a sixth one of the ducts extend over the engine.

26. The motorcycle of claim 25, wherein the third and fourth ones of the ducts are disposed laterally outward from the engine.

27. The motorcycle of claim 22, wherein the frame further comprises a pair of rear stays secured to rear portions of the bottom pipes and extending upwardly therefrom; and
   a top frame portion secured between the steering head and the rear stays.

28. The motorcycle of claim 27, wherein the frame further comprises a rear swing frame pivotally connected to the rear stays and to which the rear wheel is mounted.

29. The motorcycle of claim 28, wherein the radiator is secured to the rear swing frame.

30. A motorcycle comprising:
   (a.) front and rear wheels;
   (b.) an engine disposed between the front and rear wheels;
   (c.) a radiator disposed between the engine and the rear wheel;
   (d.) a frame supporting the engine and the radiator on the front and rear wheels, said frame comprising:
      a steering head;
      a pair of rear stays; and
      a top frame structure extending between and interconnecting the steering head and the rear stays, said top frame structure comprising a pair of seat rails and a duct structure, said pair of seat rails connecting the rear stays to a duct structure, said duct structure being affixed to the steering head and comprising at least one air duct for guiding cooling air to the radiator, said at least one air duct extending over the engine and having an inlet located at about the steering head and an outlet positioned to permit exiting air to communicate with the radiator;
   (e.) a fuel tank disposed over and supported on the top frame structure; and
   (f.) a seat disposed over and supported on the seat rails.

31. The motorcycle of claim 30, wherein the at least one air duct comprises a pair of top air ducts for guiding cooling air to the radiator, said top air ducts extending over the engine and having inlets disposed on opposing sides of the steering head and outlets positioned to permit exiting air to communicate with the radiator.

32. The motorcycle of claim 31, wherein the top air ducts are affixed to opposing sides of the steering head.

33. The motorcycle of claim 32, wherein the frame further comprises a pair of spaced-apart down pipes secured to the steering head and extending downwardly and rearwardly therefrom, and wherein said motorcycle further comprises a middle air duct for guiding cooling air to the radiator, said middle air duct extending over the engine and having an inlet located below the steering head and laterally aligned with a space between the down pipes and an outlet positioned to permit exiting air to communicate with the radiator, said inlets of the top air ducts being disposed above the inlet of the middle air duct.

34. The motorcycle of claim 33, wherein the outlet of the middle air duct is laterally and longitudinally aligned with the outlets of the top air ducts.

35. The motorcycle of claim 34, wherein the outlet of the middle air duct is disposed between the outlets of the top air ducts.

* * * * *